Patented Aug. 30, 1927.

1,641,005

UNITED STATES PATENT OFFICE.

RALPH H. McKEE, OF NEW YORK, N. Y.

PROCESS OF MAKING ALKYL SULPHATES.

No Drawing. Application filed May 21, 1923, Serial No. 640,551. Renewed July 13, 1927.

This invention relates to processes of making alkyl sulphates, and more particularly to the manufacture of an alykl sulphate, such as di-ethyl sulphate, by the reaction of sulphuryl chlorid on the corresponding alcohol, such as ethyl alcohol.

In the manufacture of alykl sulphates by known methods, an alcohol is usually treated with sulphuric acid and the resulting material distilled under reduced pressure to obtain the desired sulphate. This method is open to the disadvantages that it results in the formation of hydrocarbon by-products and in general gives a low yield.

It has also been proposed to make di-methyl sulphate by running sulphur dioxid and chlorine simultaneously or successively into methyl alcohol. This process is said to produce a yield of approximately 50 per cent di-methyl sulphate, but it is open to the disadvantage that about the same amount of methyl chlorid is formed. Each of these processes are unsatisfactory in that they do not work smoothly, produce low yields, and large amounts of by-products. The manufacture of di-ethyl sulphate and ethyl chlorid by mixing sulphuryl chlorid and ethyl alcohol has been proposed, but experiments along these lines have resulted in the formation of other products, such as chlorsulphonic acid.

An object of the invention is the provision of a more simple method of obtaining di-ethyl sulphate, and similar alkyl sulphates, and good yields from sulphuryl chlorid and ethyl alcohol or other alcohols.

The process consists essentially in the addition of sulphuryl chlorid to the alcohol. If the addition is in the reverse direction, ethyl hydrogen sulphate is formed in large quantities instead of di-ethyl sulphate. The best yields are obtained by adding one molecular equivalent of sulphuryl chlorid to one molecular equivalent of alcohol, such as ethyl alcohol, at a temperature of approximately 30° C. Some ethyl chlorid is formed, but it is present in very small quantity, whereas under known processes, it has been a major product.

In practicing the process, the sulphuryl chlorid is added to ethyl alcohol when di-ethyl sulphate is to be formed or to other corresponding alcohols when other alkyl sulphates are to be formed. Absolute ethyl alcohol is preferred over 95 per cent alcohol, although the latter may be used. As stated, it is essential that the sulphuryl chlorid be added to the alcohol to prevent the formation of ethyl hydrogen sulphate. The sulphuryl chlorid is preferably added in the proportion of one molecular equivalent of sulphuryl chlorid to one molecular equivalent of ethyl alcohol at a temperature of approximately 30° C. The material is stirred vigorously during the addition of the sulphuryl chlorid as considerable heat is evolved and this must be removed through the walls of the vessel during the process. To separate the sulphate from the other materials produced, the temperature is raised until the excess sulphuryl chlorid has been removed by distillation. A temperature of from 100 to 120° C. is employed for the removal of the excess reagent. The mixture is then cooled to about 60° C. and run into cooled water. The di-ethyl sulphate settles out in the form of a heavy liquid which may be washed with fresh water and dried to form a commercially pure product. Under some circumstances, it may be further purified by distillation in a partial vacuum but this is usually unnecessary. A considerable quantity of unused alcohol may be recovered from the wash water by simple distillation.

One molecule of sulphuryl chlorid to one molecule of ethyl alcohol is double the theoretical amount of sulphuryl alcohol for the equation. The reaction takes place according to the equation

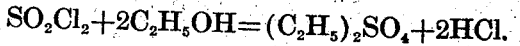

$SO_2Cl_2 + 2C_2H_5OH = (C_2H_5)_2SO_4 + 2HCl.$

While the process above described is exceedingly simple, it is by far the cheapest method of making di-ethyl sulphate and similar ethyl sulphates. The process yields itself readily to manufacture on a large scale and the reacting substances are readily obtainable in commercial quantities. A very good yield of the desired sulphate is obtained and the recovery of the sulphate and the excess sulphuryl chlorid is exceedingly simple.

As stated, the use of one molecular equivalent of alcohol to one molecular equivalent of sulphuryl chlorid in which the sulphuryl chlorid is added to the alcohol at a temperature of substantially 30° C. is important to obtain a good yield of ethyl sulphate.

Other similar alkyl sulphates, such as di-methyl sulphate, di-butyl sulphate, and diamyl sulphate may be formed by employing the corresponding alcohols in place of ethyl alcohol.

While I have described in detail the preferred practice of my process, it is to be understood that the details of procedure and proportion of ingredients may be widely varied, and that known chemical equivalents may be employed in place of the materials mentioned, without departing from the spirit of the invention or the scope of the subjoined claims.

Having thus described my invention, I claim:

1. The process of making alkyl sulphate which comprises adding sulphuryl chlorid to an alcohol at a temperature of substantially 30° C.

2. The process of making di-ethyl sulphate which comprises adding sulphuryl chlorid to ethyl alcohol at a temperature of substantially 30° C.

3. The process of making di-ethyl sulphate which comprises adding sulphuryl chlorid to ethyl alcohol in the proportion of one molecular equivalent of sulphuryl chlorid to one molecular equivalent of ethyl alcohol at a temperature of substantially 30° C.

4. The process of making alkyl sulphates which comprises adding sulphuryl chlorid to an alcohol, stirring the material to remove the heat evolved, and maintaining a temperature of substantially 30° C.

In testimony whereof. I affix my signature.

RALPH H. McKEE.